Sept. 18, 1951     T. O. MEHAN     2,568,350
CONTROL MEANS FOR DIFFERENTIAL ACTUATORS
Filed March 14, 1946     5 Sheets-Sheet 1
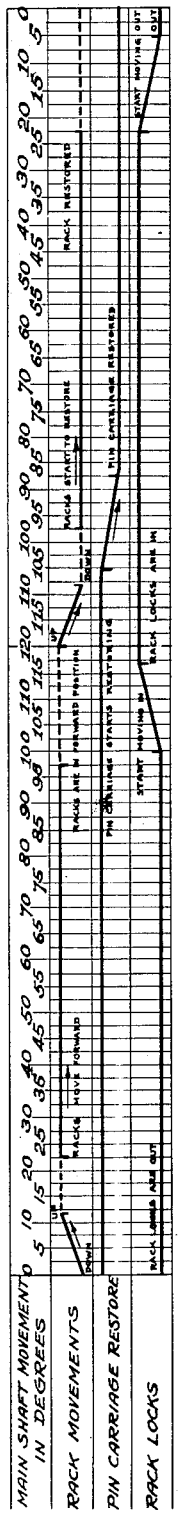
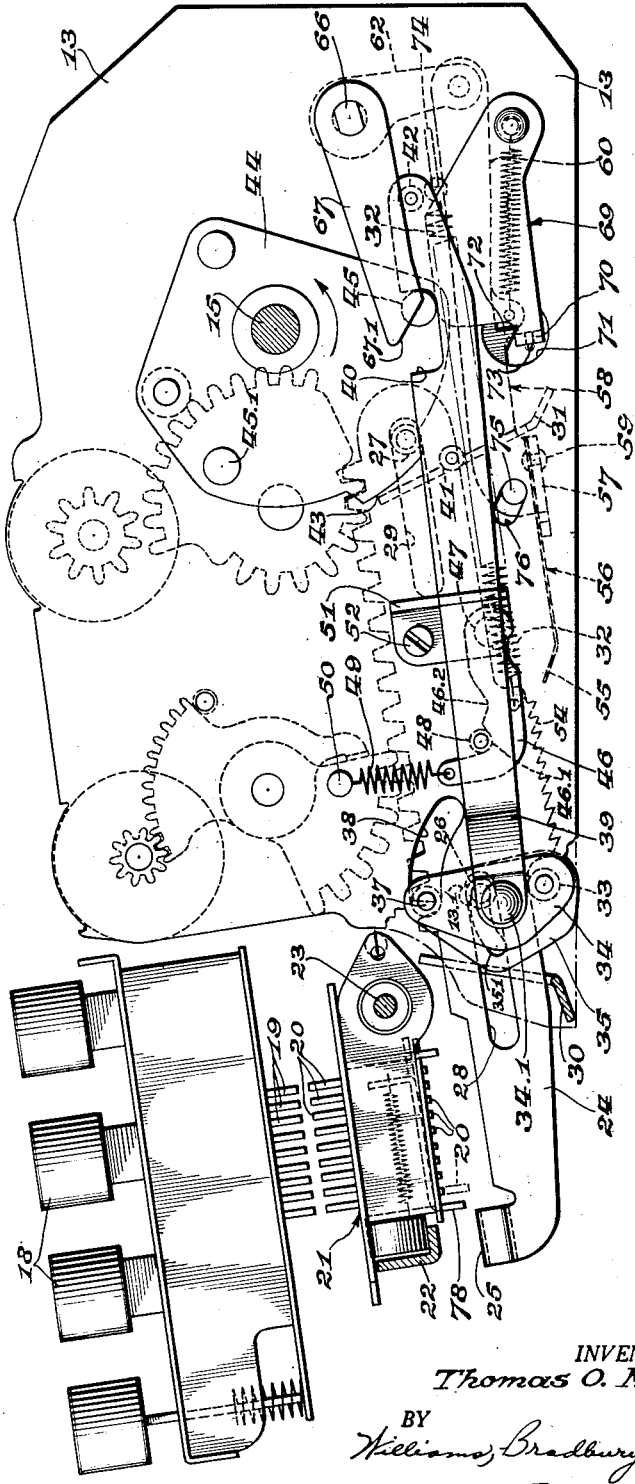
INVENTOR.
Thomas O. Mehan
BY
Williams, Bradbury & Luke
Attorneys.

Sept. 18, 1951 T. O. MEHAN 2,568,350
CONTROL MEANS FOR DIFFERENTIAL ACTUATORS
Filed March 14, 1946 5 Sheets-Sheet 2
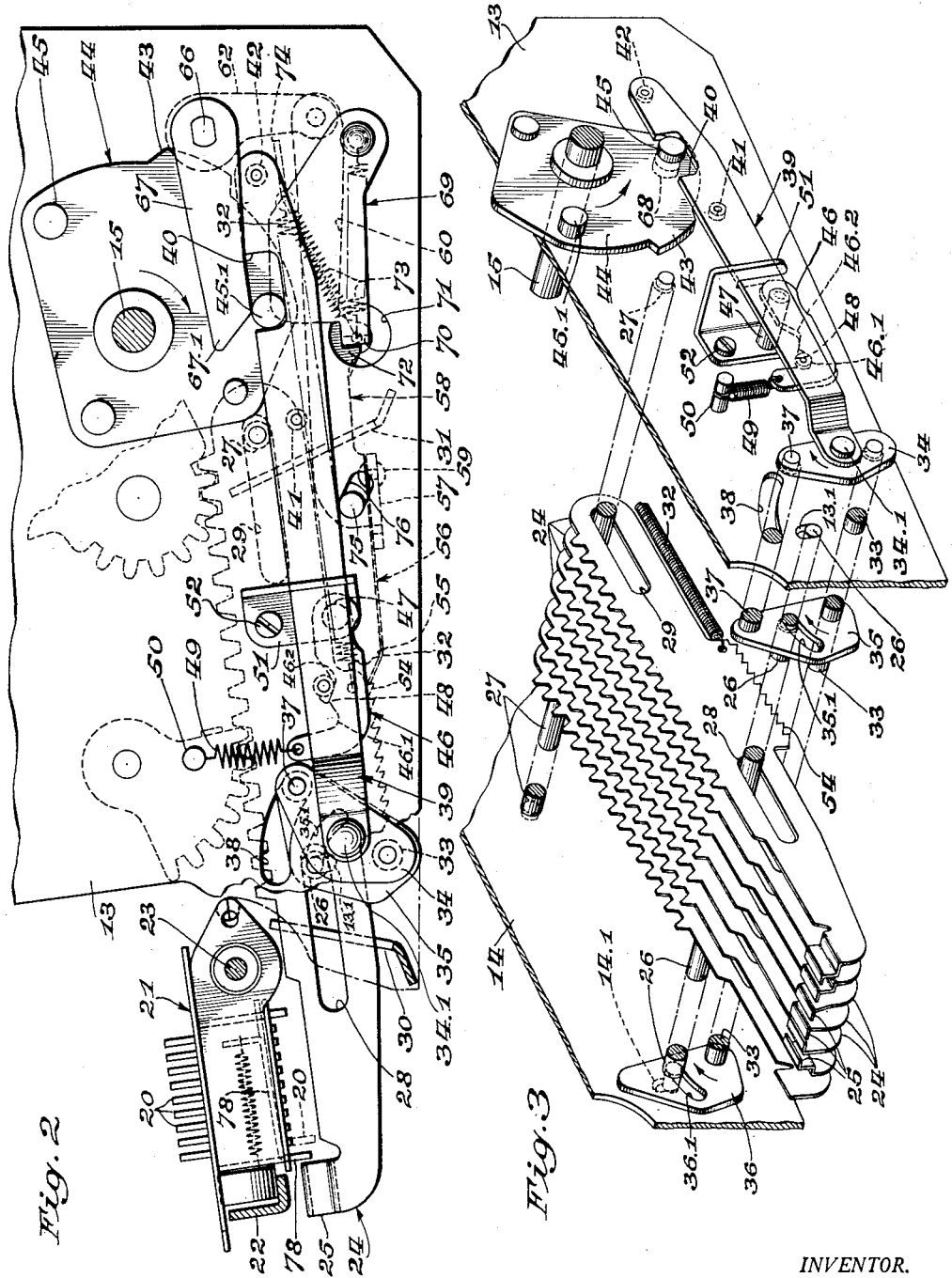
INVENTOR.
Thomas O. Mehan
BY
Williams, Bradbury & Hinkle
Attorneys.

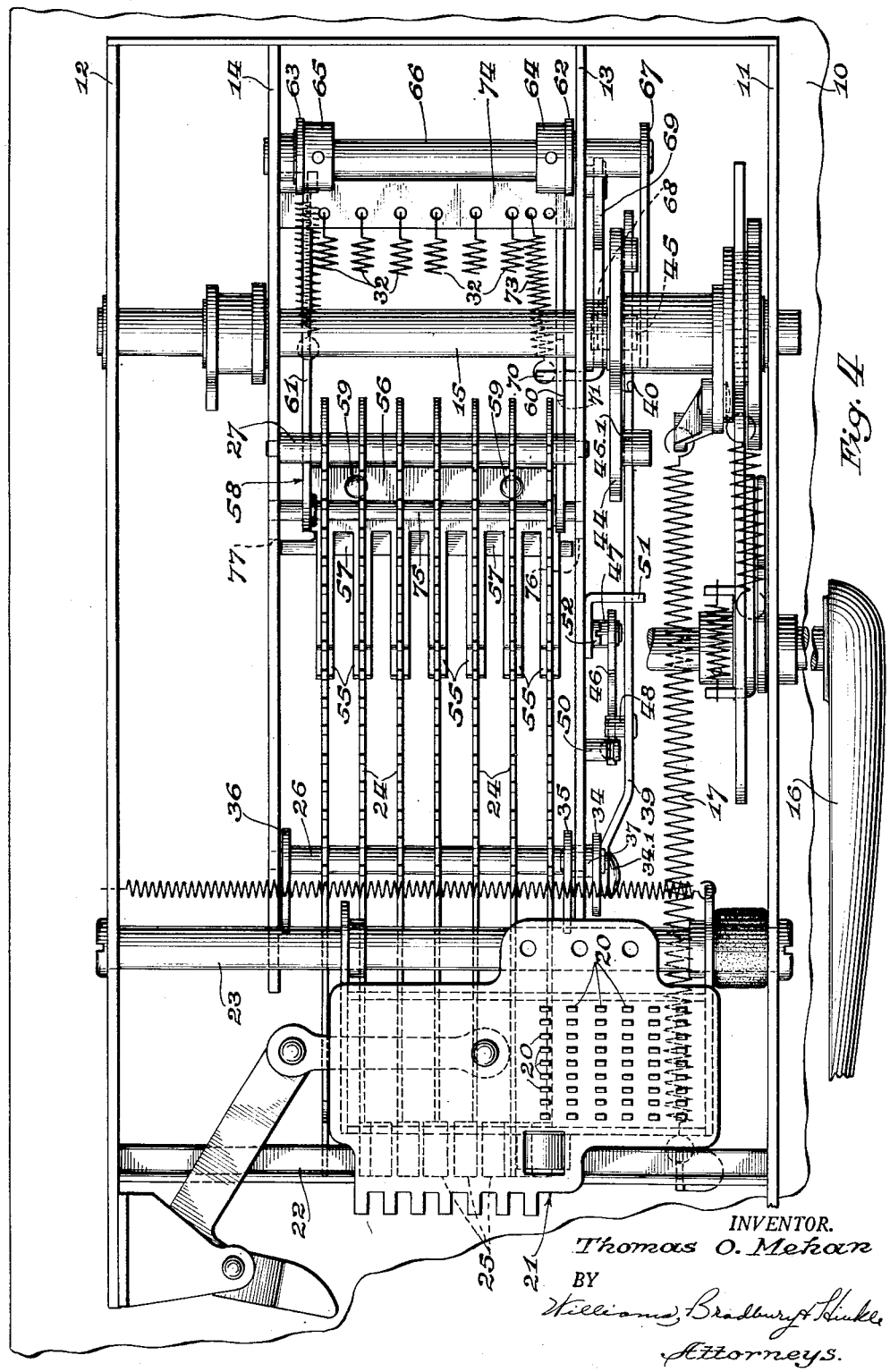

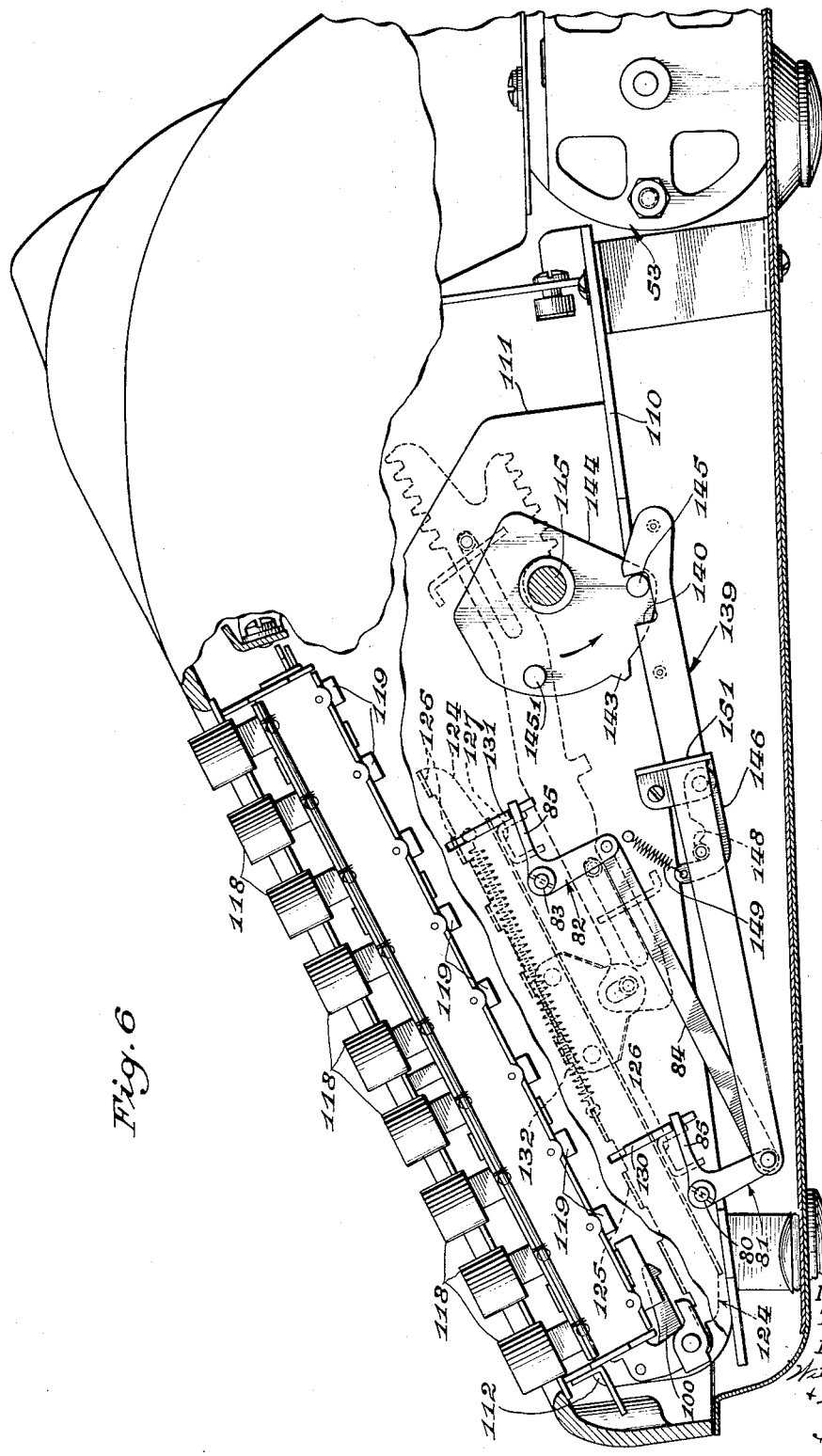

Sept. 18, 1951 T. O. MEHAN 2,568,350

CONTROL MEANS FOR DIFFERENTIAL ACTUATORS

Filed March 14, 1946 5 Sheets-Sheet 5

INVENTOR.
Thomas O. Mehan
BY
Williams Bradbury & Hinkle
Attorneys.

Patented Sept. 18, 1951

2,568,350

UNITED STATES PATENT OFFICE 2,568,350

CONTROL MEANS FOR DIFFERENTIAL ACTUATORS

Thomas O. Mehan, Park Ridge, Ill., assignor to Victor Adding Machine Co., Chicago, Ill., a corporation of Illinois Application March 14, 1946, Serial No. 654,424

1 Claim. (Cl. 235—60)

My invention relates generally to calculating and adding machines, and more particularly to improvements in means for controlling the operation of the movable actuators of such machines.

The principal object of my invention is to provide improved means to increase the overall speed of operation of a calculating or adding machine, without increasing the speed at which the mechanism of the machine is required to operate.

Heretofore, in calculating or adding machines of the type employing movable actuators or sectors, a short interval of time is lost, from an operator's viewpoint, for each machine cycle due to the fact that the operator cannot set up a second amount in the keyboard until the machine has fully completed its cycle for the first amount entered.

The reasons for this loss of time will be briefly explained in connection with calculating machines of the ten key type, and then in connection with machines of the full key type.

It is well known to those skilled in the art of calculating machines that when an amount is entered, or set up, in a ten key machine, the conventional stop pin carriage is caused to move transversely one denominational order for each key depressed, and, during the initial portion of an operating cycle, its stop pins are engaged by stop shoulders on the actuating racks (or sectors) corresponding to the denominational orders set up in the stop pin carriage. The extent of rearward travel of the actuators will be determined by the numerical value of the keys depressed. With this conventional construction, it becomes necessary to delay the restoration of the pin carriage until after the actuators are restored to their home or normal position in order to avoid collision between the set stop pins of the carriage and the stop shoulders of the actuators. The return of the stop pin carriage to its home position takes place near the end of the operating cycle and thus precludes the entry of a second amount in the keyboard until the end of the machine operating cycle.

When an amount is set up in a full keyboard machine, the depending stems of the keys depressed are directly engaged by the stop shoulders on the actuators, and the extent of rearward travel of the actuators will be determined by the numerical value of the keys depressed. In this conventional type of calculating machine it is necessary that the actuators be fully restored to their home positions before a second amount can be entered in the key board so that collision between the depending stems of the depressed keys and the stop shoulders of the actuators is avoided, as the latter return forward near the end of the adding cycle.

An important object of my invention, therefore, is to provide new and novel means for the control of movable actuators of adding and calculating machines so that amounts can be entered in the keyboards of such machines before the actuators or sectors are fully restored, without danger of interference or collision between the movable parts of the machines.

Still further, and more limitedly, it is the purpose of my invention to permit entry of an item in a calculating or adding machine at approximately midway of its operating cycle. I accomplish this by lowering the actuators, or the stop shoulders thereof, so that earlier restoration of the stop pin carriage and entry of a subsequent amount can be had in machines of the ten key type, and earlier entry of a subsequent amount can be had in machines of the full key board type before the actuators are fully restored.

The foregoing objects, and others hereinafter appearing, are attained in the embodiment of the invention illustrated in the accompanying drawings, wherein:

Fig. 1 is a fragmentary longitudinal sectional view of a ten key adding machine, embodying the principles of the present invention, and showing particularly the means for controlling the movable actuators which are shown in their normal lowered position;

Fig. 2 is a view similar to Fig. 1, with the keyboard omitted, and showing the main shaft moved to mid-cycle position with the actuators locked in their elevated position;

Fig. 3 is a fragmentary isometric view clearly illustrating the novel control mechanism for the actuators;

Fig. 4 is a fragmentary plan view, with the casing and keyboard removed, and including a manually operable crank for driving the main shaft through its forward stroke;

Fig. 5 is a timing chart for the ten key machine shown in Figs. 1 to 4;

Fig. 6 is a fragmentary longitudinal sectional view, partly in elevation, illustrating a full keyboard machine embodying the principles of the present invention and showing the actuators in their normal lowered position;

Figure 7:
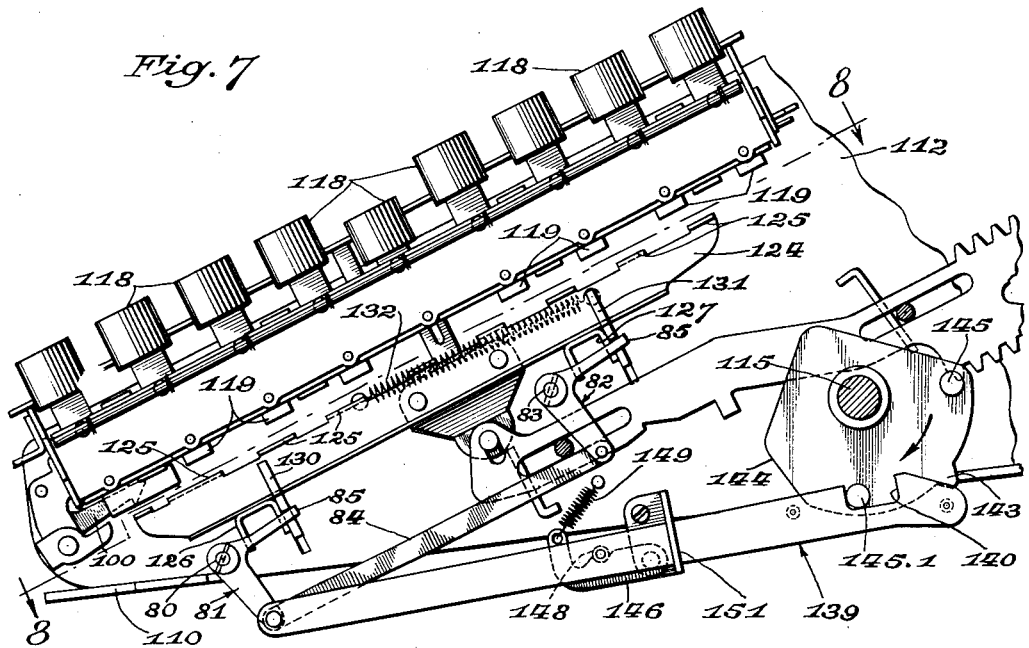
Fig. 7 is a fragmentary longitudinal sectional view, similar to Fig. 6, with certain parts, such as the case and motor, omitted, and showing the actuators in elevated positions.

Since the invention disclosed is concerned primarily with new and novel controls for adding and calculating machine actuators, only so much of the machine as is necessary for the understanding of the present invention is shown. For a further and more complete disclosure of the structural features of the ten key machine shown in the present application, reference may be had to my prior application Serial No. 566,980, filed December 7, 1944, issued as Patent No. 2,486,959 on November 1, 1949, and for more structural details of the full key machine here shown, attention is invited to my prior application Serial No. 371,366, filed December 23, 1940, which has matured into Patent No. 2,411,050.

Referring now to the drawings for a detailed explanation of my invention, the invention will be described first as it may be utilized in a ten key adding or calculating machine, reference being had to Figs. 1 to 5, and 9.

In the plan view, Fig. 4, the ten key machine is shown as comprising a base 10 to which a pair of outer frame plates 11 and 12, and a pair of intermediate frame plates 13 and 14, are suitably secured. A main operating shaft 15 is mounted for rocking motion in these frame plates, and in the embodiment shown is rocked through its forward stroke by the conventional hand crank 16, and through its return stroke by a main spring 17. It will be understood, however, that the main shaft may be rocked by an electric motor, if desired, since the manner in which the main shaft is driven has no effect upon the present invention.

Amounts to be entered in the machine are set up by the successive depression of the required spring-returned 0 to 9 numeral keys 18 (Fig. 1), each having a depending stem 19. The lower ends of the stems 19 are in fore and aft alignment and normally lie in registry above a row of stop pins 20 mounted in the usual manner in a stop pin carriage 21. This carriage is transversely reciprocable, being carried by a pair of cross rails 22—23.

A plurality of actuators, shown as racks 24, one for each denominational order of the machine, and each having a stop shoulder 25, are guided for longitudinal movement by transverse rods 26 and 27 mounted in the frame plates 13 and 14, these rods passing through elongated openings or slots 28 and 29 in the actuators 24, as clearly shown in Fig. 3.

The actuators 24 are maintained in properly spaced relation by a pair of conventional combs 30 and 31, and long tension springs 32 are provided to move them rearwardly, or to the right as viewed in Figs. 1 to 4.

*Rack elevating and lowering mechanism*

The mechanism for elevating and lowering the racks or actuators 24 will now be described.

Referring to Fig. 3, it will be observed that transverse rod 27 is securely mounted between the frame plates 13 and 14, and serves as a fulcrum about which the actuators 24 may pivot, and that the ends of transverse shaft 26 are received by elongated slots 13.1 and 14.1 in the frame plates 13 and 14, respectively. A third shaft 33, below and somewhat forward of shaft 26, is pivotally supported within the frame plates 13 and 14 and rigidly carries an arm 34 and a pair of cam plates 35, 36. The arm 34 is located outside the frame plate 13 and cam plate 35 is positioned inside said plate, while cam plate 36 is located just inside of frame plate 14. Arcuate slots 35.1 and 36.1 in the cam plates 35 and 36, respectively, receive the shaft 26 and serve to elevate and lower this shaft when the cams are rocked on their pivot shaft 33 in a manner and for reasons presently to be described.

The upper ends of arm 34 and cam plate 35 are joined by a stud 37 which passes through an arcuate clearance slot 38 in the frame plate 13. When the arm 34 is rocked clockwise (Fig. 3), cam plates 35, 36 will also be rocked clockwise and shaft 26 will be elevated within the elongated slots 13.1 and 14.1, in frames 13, 14 by a camming action of the slots 35.1, 36.1 upon the shaft 26.

The means for rocking cam arm 34 comprises an offset link 39, one end of which is pivotally attached to arm 34, midway of the shaft 33 and stud 37, by a shoulder stud 34.1, and its other end has a notch 40 and inwardly projecting studs 41 and 42. These studs cooperate with a rise portion 43 on a cam plate 44, to disengage a stud 45 on the plate 44 from notch 40 in a manner presently to be described. Pivoted upon a stud 47, projecting from the frame plate 13, is a detent lever 46 which is held in engagement with stud 48, projecting inwardly from link 39, by a spring 49. One end of this spring is anchored to a stud 50 projecting outwardly from the frame plate 13, and its other end is secured to the free end of detent lever 46, as clearly shown in Fig. 3. Link 39 is guided for longitudinal movement by a slotted bracket 51 attached to frame 13 by the stud 47 and a screw 52.

It will now be understood, by reference to Fig. 3 and to the timing chart shown in Fig. 5, that when an operating cycle of the machine is started by crank 16, or the conventional motor 53 (Fig. 6), main shaft 15 will be rocked counterclockwise during its forward stroke by said crank or motor, and clockwise during its return stroke by the main spring 17. The construction is such that when the main shaft begins its forward stroke, cam plate 44 will be rotated counterclockwise, and its stud 45 will engage the rearward end of notch 40, thus pulling link 39 rearwardly, which in turn rocks the cam arm 34 clockwise to elevate shaft 26 in the manner heretofore explained.

When shaft 26 is elevated, the shouldered ends 25 of actuators 24 are also elevated, or swung upon their pivot shaft 27 from the position shown in Figs. 1 and 3 into the position shown in Fig. 2. This elevation of the forward ends of the actuators brings their stop shoulders 25 in position to engage any stops 20 of the traveling pin carriage which may have been depressed. From the timing chart of Fig. 5, it will be noted that actuators 24 are moved from their lowered normal position to their elevated position during the first 12° of main shaft movement, and that they remain in this elevated position until the end of the forward stroke, which is shown in the chart as 120° counterclockwise movement of the main shaft 15. When the end of the forward stroke is completed, and the return stroke starts, actuators 24 are again lowered, such movement taking place during the first 12° of clockwise movement imparted to the main shaft by the main spring 17. Thus it will be understood that actuators 24 are lowered before they start their return stroke.

At the beginning of the return stroke, stud 45.1, carried by the cam plate 44, will have moved into notch 40 of link 39, and as the cam plate 44 is rocked clockwise this stud will engage the forward end of notch 40 to move link 39 forwardly a distance sufficient to remove stud 48 from notch 46.2 to notch 46.1 of detent lever 46. This forward movement of link 39, cam arm 34, and cam plates 35 and 36, previously described, thus lowers shaft 26 in its frame slots 13.1 and 14.1, and in turn lowers the shoulder ends of actuators 24. This permits the pin carriage to be restored immediately and permits the operator to enter a subsequent amount in the keyboard during the remainder of the return stroke for the previous amount entered.

Attention is invited to the fact that the movement of cam plate 44 is considerably greater than the movement of link 39, and for this reason it becomes necessary to swing the free end of said link downwardly to release the studs 45 and 45.1 from the notch 40 after they have moved the link from one to the other of its operative positions. It will now be clear that when stud 45 drives the link 39 rearwardly, its detent stud 48 will be moved from notch 46.1 to notch 46.2 of the detent lever 46, and near the end of this movement the rise portion 43 of the cam plate 44 will have engaged stud 41 to force the link downwardly against the tension of spring 49, thereby lowering the rearward end of said link to permit stud 45 to be disengaged from slot 40 during the remainder of the counterclockwise movement of the cam plate 44. The elevated position of the link 39 is determined by the depth of the slot in bracket 51. As the cam plate 44 approaches the end of its forward or counterclockwise stroke, stud 45.1 moves into position in the notch 40. Consequently, when the return stroke of the machine begins, stud 45.1 will move link 39 forwardly until its detent stud 48 leaves notch 46.2 and seats within notch 46.1 of the detent lever 46, and when this has taken place the rise portion 43 cams stud 42 downwardly to free the pin 45.1 from slot 40, so that the remaining clockwise movement of the plate 44 imparts no further movement to link 39.

*Actuator or rack locking mechanism*

It has been found convenient to prevent excessive rearward motion of actuators 24 during adding and total taking operations where transfer dials (that is, numeral dials for indicating the last amount entered into the accumulator) are employed, and the locking means for accomplishing this result will now be described. With reference to Figs. 1, 2, and 4, it will be noted that each actuator or rack has a series of saw-toothed teeth 54 cut in its bottom edge for cooperation with the upwardly bent fingers 55 of a locking plate 56 at the proper time and in a manner presently to be described.

The locking plate 56 is rigidly attached to yoke portion 57 of a bail 58 in any suitable manner, for example, by rivets 59. Arms 60 and 61 (Fig. 4) of the bail 58 are pivotally connected to depending arms 62, 63 having hubs 64, 65, respectively, pinned to a shaft 66. This shaft is mounted for rocking movement in the frame plates 13, 14. Shaft 66 projects outwardly beyond the frame plate 13 to rigidly support a cam arm 67 which is engaged by the stud 45.1 on cam plate 44 to move the locking fingers 55 into locking engagement with the teeth 54 of the actuators 24. It will be noted that stud 45.1 is longer than stud 45 so that the latter stud does not contact the cam arm 67.

Cam plate 44 is further provided with an inwardly projecting stud 68 (Fig. 4) which is in axial alignment with the previously mentioned stud 45. Pivotally mounted on the outside of frame plate 13 is a latch plate 69, the free end 70 of which is bent inwardly and passes through a clearance hole 71 in the frame plate 13. This latch plate is resiliently held in engagement with a tooth 72 integrally formed with the lower edge of the bail arm 60 by a spring 73 (Figs. 2 and 4). One end of the spring is anchored in the spring plate 74 and its other end secured to the free end 70 of latch 69. The forward end of bail 58 is supported by a shaft 75 carried by the arms 60, 61, the ends of this shaft being slidably received by inclined slots 76, 77 of plates 13 and 14, respectively.

Referring now to the operation of the rack lock just described, it will be noted from the chart of Fig. 5, that fingers 55 remain in the position in which they are shown in Fig. 1 until the main shaft is rocked through approximately 100° of its forward stroke. By this time stud 45.1 will have engaged the cam face 67.1 of the cam arm 67, whereupon further movement of the main shaft will cause said stud to rock the cam arm clockwise until such time as the main shaft reaches approximately 117° forward movement. This clockwise movement of the cam arm 67 in turn imparts a corresponding movement to shaft 66 and through the arms 60, 61 moves the bail 58 to the left as viewed in Fig. 1 and upwardly, by reason of the shaft 75 operating within the inclined slots 76, 77, to cause the fingers 55 to mesh with the teeth 54 of the racks 24. This engagement of the fingers 55 with the rack teeth 54 prevents any further rearward movement of the racks until said fingers are disengaged. The fingers 55 are held in engagement with the teeth 54 by the latch plate 69, the inwardly turned end 70 of which engages behind the tooth 72 on the bail arm 52 and thus prevents retraction of the fingers 55 as shown in Fig. 2.

From the chart shown in Fig. 5, it will be clear that racks 24 are locked just prior to the end of the forward stroke of a machine operating cycle, and that the bail is restored near the end of the return stroke of said operating cycle. Such restoration of the fingers 55 to normal position is accomplished near the end of the operating cycle by the spring 73 when the stud 68 engages the latch plate 69, swinging it downwardly to move the inwardly extending portion 70 thereof from its latching position behind the tooth 72.

*Operation*

In describing the operation of my improved control for the actuators, it will be recalled that transverse rod 26 normally holds said actuators in lowered position, as shown in Fig. 1, and when in this position their stop shoulders 25 are below the plane of the lower ends of any of the stop pins 20, which may have been depressed and below the conventional trap door 78 carried by the stop pin carriage 21. It has been explained that racks 24 are elevated during the first 12° of main shaft movement to bring their stops 25 into position to be stopped by the trap door 78 or the depressed pins 20 before they start their rearward excursions.

It is well known to those skilled in the art that in ten key machines, each time a numeral key 18 is depressed, its corresponding stop pin will be depressed to limit the forward movement of its associated actuator 24. Accordingly, each time a numeral key is depressed, the pin carriage 21 will advance one unit to the left and trap door 78 will prevent forward motion of all actuators to the left of the highest denominational order digit entered into the keyboard.

It is also well known, in the operation of ten key machines of the prior art, that after an amount is entered in the keyboard said amount will be set up in the stop carriage, and, during the forward stroke of the machine, one actuator for each digit entered is given a forward excursion a distance depending upon the numerical value of the numeral key depressed. In such conventional constructions it is clear that restoration of the actuators cannot take place during the time the pin carriage is being returned to its normal right-hand position, and therefore it has been the conventional practice to delay the restoration of the pin carriage until after the actuators have been fully restored by the well known restoring bail. Thus in such prior machines it was impossible to enter a second amount before the actuators were fully restored, due to the delay necessary for restoring the pin carriage until just prior to the end of the return stroke of a machine operating cycle.

Figure 9:
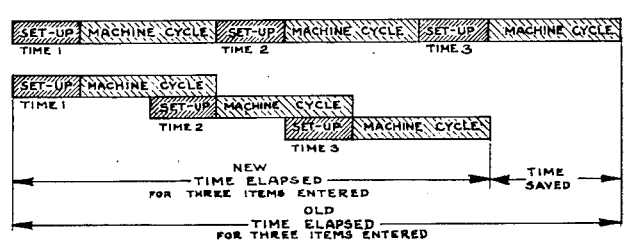
Fig. 9 is a diagrammatic chart showing the time saved during three machine cycles with a machine equipped with the present invention as compared with a conventional machine.

However, according to my present invention, it is possible to start the return of the stop pin carriage after approximately 14° of the main shaft return stroke has taken place. This permits an operator to set up a second amount in the pin carriage while the actuators are being restored during the remaining portion of the return stroke of the machine cycle initiated for the first amount entered. This is due to the fact that while the actuators are being restored they are held in their lowered position and thus prevent collision between their shoulders 25 and the stop pins 20 depressed during entry of a second amount into the machine. The graphic chart, Fig. 9, shows the elapsed time required for the addition of three amounts entered in a conventional ten key machine as compared with elapsed time for the addition of three amounts entered in a ten key machine embodying my improvement. From this chart it will be observed that the time for one machine cycle is saved for each three amounts added, as compared with conventional machines.

*Full key machine*

Figure 8:
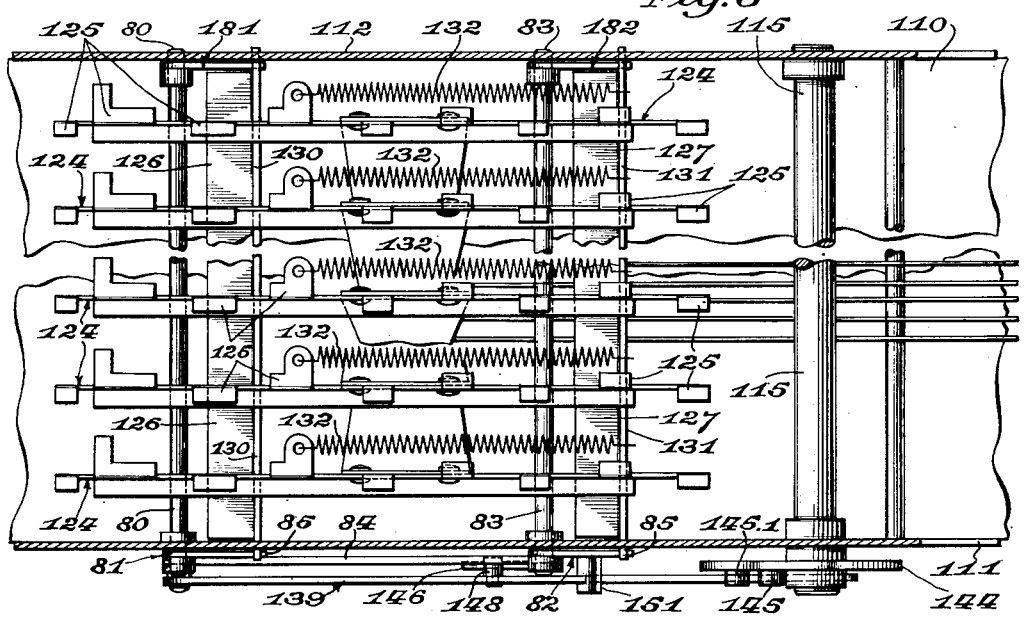
Fig. 8 is a fragmentary sectional view taken on the line 8—8 of Fig. 7.

Referring now to a detailed description of my invention, as embodied in a full keyboard machine, it will be observed from Figs. 6 to 8 that the same general mechanism for raising and lowering the actuators is employed. It should be noted, however, that the actuator racks for the full keyboard machine are given a straight line motion when being elevated or lowered, instead of a pivotal motion in the manner described for the ten key machine. In Fig. 8 the full key machine is partially shown as comprising a base 110 to which a pair of frame plates 111 and 112 respectively, are suitably secured. Mounted for rocking motion in these plates is a main operating shaft 115 which is rocked through the forward and return strokes of a machine operating cycle by a motor 53 (Fig. 6) in the conventional and well known manner. Amounts to be entered in the machine are set up by means of the usual depressible spring return numeral keys 118, each having a depending stem 119. The stems for each longitudinal row of keys are substantially in longitudinal alignment and their lower ends are adapted to cooperate with stop shoulders 125 formed as integral parts of actuators or racks 124. The actuators are supported by transverse U-shaped members 126, 127, and are retained in properly spaced relation by a pair of combs 130, 131, the latter being secured to members 126 and 127, respectively. Each actuator 124 has a long tension spring 132 to move it rearwardly, or to the right as viewed in Figs. 6 to 8, when it is released from the conventional hook 100 through depression of any key of its associated row of keys.

*Rack elevating and lowering mechanism*

It will be noted from Figs. 6 to 8 that the mechanism for elevating and lowering the actuators 124 comprises a cam plate 144 fixed to the main shaft 115. This cam plate has outwardly projecting studs 145 and 145.1 and a cam rise 143 similar to that disclosed in the ten key machine. However, the dwell portion of the cam rise 143 is considerably shorter than the dwell portion of cam rise 43 of the plate 44, due to the fact that main shaft 115 of the full keyboard machine has a smaller angular movement than the main shaft 15 shown in the ten key machine. Studs 145 and 145.1 alternately engage a notch 140 in one end of link 139 in a manner presently to be described, and the other end of said link is pivotally connected to a bell crank 81. The link 139 is guided for longitudinal movement within a slot in the bracket 151. An inwardly projecting stud 148 carried by the link 139 cooperates with detent lever 146 which is resiliently urged into engagement with said stud by a spring 149.

Pinned to one end of a shaft 80 (Fig. 8) which is carried by the frame plates 111 and 112, is a bell crank 81 and also pinned to this shaft is a second bell crank 181. The former bell crank is located outside the frame plate 111 and the latter bell crank is located inside the frame plate 112 as clearly shown in Fig. 8. Pinned to a second shaft 83, which is also pivotally mounted in the frame plates 111, 112, is a second pair of bell cranks 82, and 182. The downwardly projecting leg of bell cranks 81 and 82 are connected by a link 84 and consequently any movement imparted to the bell crank 81 by link 139 will cause all of said bell cranks to be rocked in unison. Each of the bell cranks has an arm 85, and these arms of the bell cranks 81 and 181 cooperate with the combs 130, while the arms 85 of bell cranks 82 and 182 cooperate with the comb 131, the construction being such that when the bell cranks are rocked counterclockwise through rearward movement of link 139, combs 130, 131, and in turn the cross members 126, 127, will be elevated to raise actuators 124 so that their stop shoulders 125 will be in position to cooperate with any depressed key stems 119. In Fig. 6 the actuators 124 are shown in their lowered or normal position, whereas Fig. 7 illustrates the actuators in elevated position.

*Operation of full keyboard machine*

From the foregoing, the obvious operation of my improved rack movement is as follows. As the main shaft 115 starts its counterclockwise rotation during the forward stroke of a machine operating cycle, stud 145 pulls link 139 rearwardly, or to the right, as viewed in Fig. 6, whereupon all of the bell cranks will be rocked counterclockwise to elevate the combs 130, 131, support members 126, 127, and the actuators 124, so that the stop shoulders 125 of said actuators are in a position to be stopped by the key stems 119 of any keys which may have been depressed through entry of an amount set up in the keyboard. At the beginning of the return stroke of a machine operating cycle, main shaft 115 and cam plate 144 are rocked clockwise and stud 145.1, engaging in notch 140 of link 139, will push said link forwardly, or to the left, as viewed in Fig. 6. Thus all the bell cranks will be rocked clockwise to lower the actuators 124 and cause disengagement of stop shoulders 125 with the depending stems 119 of any depressed digit keys 118. At this time the springs 132 will pull the actuators 124 rearwardly to the "9" stop position, all of the racks which have been actuated, but since by this time the accumulator pinions will have been engaged, this will result merely in idle movement of the accumulator pinions each to an extent complementary to the depressed numeral key in its denominational order, compensation for such idle movement being made as the racks are restored to normal position.

The depressed keys are released in the usual and well known manner at the same time the racks are lowered, and this enables the operator immediately to enter a second item in the keyboard while the machine is completing its return stroke of the operating cycle initiated for the first amount entered in the keyboard. Due to the fact that the actuators 124 are lowered before they start upon their return stroke, no interference or collision of the stops 125 with the stems 119 is possible, and accordingly this permits almost double speed for the operator of an electric machine since a second amount can be entered in the keyboard while the machine is completing the return stroke of the first amount entered, without waiting for the machine fully to complete its operating cycle for the first amount entered.

Electrically operated adding machines, if constructed to operate very rapidly, are noisy, wear rapidly, and are subject to troubles in service due to the misoperation of spring actuated parts. It has been found that a machine of this type operating at 120 cycles per minute represents a practical compromise between obviously desirable higher speed of operation from the users' point of view and the difficulties of design, and cost of manufacture, which are reduced if the speed of operation is lowered. If the machine were to operate at speeds much higher than 120 cycles per minute, some of the parts would have to be made stronger and harder and yet lighter in weight, the spring tensions would, in general, have to be increased, the power of the motor increased, and in many of the parts manufacturing tolerances would have to be decreased, all of these conditions tending to increase the cost of the machine and tending to increase the possibility of misoperation and service troubles.

By the use of the present invention, the speed with which most adding and calculating operations may be performed is increased by 35% to 70% as compared with the speed at which such operations may be performed using a conventional machine, and this is accomplished without increasing the actual speed of operation of the machine.

Assuming a very expert operator, the machine of my invention could theoretically be operated continuously, at 120 cycles per minute, to accomplish the addition of 120 different items in one minute, whereas with a machine of the prior art capable of operating at 120 cycles per minute, it is not even theoretically possible to accomplish the addition of more than a maximum of about 70 different items per minute.

In its broader aspects, the invention contemplates suitable means for causing the set stops to lie in the path of movement of the actuator shoulders during the first half of the machine cycle, and after the racks have thus been positioned, relatively to move the racks and stops so that the racks may be returned to normal position without engaging the stops, and so that during the major portion of the second half of the operating cycle the stops may be reset for the entry of another item.

While I have shown and described particular embodiments of my invention, it will be apparent to those skilled in the art that numerous modifications and variations may be made in the form and construction thereof without departing from the more fundamental principles of the invention. I therefore desire, by the following claim, to include within the scope of my invention all such similar and modified forms of the apparatus disclosed, by which substantially the results of the invention may be obtained by substantially the same or equivalent means.

I claim:

In a calculating machine of the class described having a plurality of differentially movable actuators, the combination of means for raising and lowering said actuators including a main shaft; a cam fixed for movement with said main shaft, a pair of outwardly projecting studs on said cam; a pair of supporting members for said actuators one of which is movable; a pair of cam plates adapted to elevate and lower said movable support member; and means for operating said cam plates from said main shaft cam including a cam arm mounted for movement with said cam plates; a link having one end pivotally connected to said cam arm and its other end provided with a notch to successively cooperate with the studs on said main shaft cam whereby initial counterclockwise movement of said main shaft will drive said link to elevate said actuators and the initial clockwise movement of said main shaft will lower said actuators substantially as set forth and for the purposes specified.

THOMAS O. MEHAN.

REFERENCES CITED

The following references are of record in the file of this patent:

UNITED STATES PATENTS

| Number | Name | Date |
| --- | --- | --- |
| 2,303,692 | Hellgren | Dec. 1, 1942 |